United States Patent
Muramoto

(10) Patent No.: US 11,995,868 B2
(45) Date of Patent: May 28, 2024

(54) IMAGE PROCESSING DEVICE, IMAGE PROVIDING SERVER, IMAGE DISPLAY METHOD, AND IMAGE PROVISION METHOD FOR NAVIGATING HORIZONTALLY OR VERTICALLY BETWEEN FLOOR IMAGES

(71) Applicant: Sony Interactive Entertainment Inc., Tokyo (JP)

(72) Inventor: Junichi Muramoto, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 256 days.

(21) Appl. No.: 16/837,323

(22) Filed: Apr. 1, 2020

(65) Prior Publication Data
US 2020/0327699 A1 Oct. 15, 2020

(30) Foreign Application Priority Data
Apr. 12, 2019 (JP) .................................. 2019-076503

(51) Int. Cl.
G06K 9/00 (2022.01)
G06F 3/04815 (2022.01)
(Continued)

(52) U.S. Cl.
CPC ............ *G06T 7/97* (2017.01); *G06F 3/04815* (2013.01); *G06T 5/50* (2013.01); *G06T 7/0002* (2013.01);
(Continued)

(58) Field of Classification Search
CPC ........... G06T 7/97; G06T 5/50; G06T 7/0002; G06T 2207/20221; G09B 29/007; G06F 3/04815
See application file for complete search history.

(56) References Cited

U.S. PATENT DOCUMENTS 4,809,072 A * 2/1989 Pohl ..................... H04N 5/2622
                                                    348/594
10,365,815 B1 * 7/2019 Stukalov ............. G06F 3/04842
(Continued)

FOREIGN PATENT DOCUMENTS

JP 2007-249977 A 9/2007
JP 2013-033122 A 2/2013
(Continued)

OTHER PUBLICATIONS

Sun, Xiaowen, et al. "Enabling participatory design of 3D virtual scenes on mobile devices." Proceedings of the 26th International Conference on World Wide Web Companion. 2017. (Year: 2017).*
(Continued)

*Primary Examiner* — Andrew M Moyer
(74) *Attorney, Agent, or Firm* — XSENSUS LLP

(57) ABSTRACT

Disclosed herein is an image processing device including an input information acquiring part that receives a user operation relating to an image displayed on a displaying device, and an image displaying part that, when the input information acquiring part receives an operation for specifying a place by a user, causes the displaying device to display thereon an image of the place. The image displaying part further causes an icon for floor number selection for selecting a floor number of a building currently displayed to be displayed and, when the input information acquiring part receives an operation, which is performed on the icon for floor number selection, for selecting another floor, changes display such that an image of the selected floor appears from a direction same as a direction corresponding to the selected floor in a vertical positional relation between the selected floor and a floor currently displayed.

8 Claims, 7 Drawing Sheets

(51) Int. Cl.
    *G06T 5/50*     (2006.01)
    *G06T 7/00*     (2017.01)
    *G09B 29/00*     (2006.01)

(52) U.S. Cl.
    CPC .. *G09B 29/007* (2013.01); *G06T 2207/20221* (2013.01)

(56) References Cited

U.S. PATENT DOCUMENTS

| | | | | |
|---|---|---|---|---|
| 11,079,995 | B1* | 8/2021 | Hulbert | G06F 3/0485 |
| 2010/0302239 | A1* | 12/2010 | Tokita | A63F 13/06 |
| | | | | 345/419 |
| 2014/0368621 | A1* | 12/2014 | Michiyama | G06T 15/20 |
| | | | | 348/50 |
| 2015/0228038 | A1 | 8/2015 | Stevenson et al. | |
| 2015/0235413 | A1* | 8/2015 | Tokashiki | G06T 17/10 |
| | | | | 345/420 |
| 2015/0304573 | A1* | 10/2015 | Yamada | H04N 5/2625 |
| | | | | 348/578 |
| 2018/0060332 | A1* | 3/2018 | Xin | H04L 12/2818 |
| 2019/0087076 | A1* | 3/2019 | Dey | H04L 12/2818 |

FOREIGN PATENT DOCUMENTS

| | | |
|---|---|---|
| JP | 2013-257280 A | 12/2013 |
| WO | 2013/161416 A1 | 10/2013 |

OTHER PUBLICATIONS

Van Hage, Willem Robert, et al. "Finding your way through the Rijksmuseum with an adaptive mobile museum guide." The Semantic Web: Research and Applications: 7th Extended Semantic Web Conference, ESWC 2010, Heraklion, Crete, Greece, May 30-Jun. 3, 2010 (Year: 2010).*

Japanese Office Action dated Dec. 6, 2022 for the Corresponding Japanese Patent Application No. 2019-076503.

Abe Yohei, "an understanding of an interaction and a base and an applied technology", Journal of the Information Processing Society of Japan Paper magazine journal vol. 5 3. No. 4 [CD-ROM], Japan, General Incorporated Foundation Information Processing Society of Japan, pp. 1349-1359 (Apr. 2012).

Office Action issued on Jan. 16, 2024, in corresponding Japanese patent Application No. 2023-039244, 10 pages.

Shun Ikeda et al., "Constructing Virtual Spaces Based on Panorama Images", a virtual 3D space based on panoramic images, a collection of electronic information communication engineers, DEWS2007 Hiroshima, B7-4, Institute of Electronics, Information and Technology Engineers, vol. 18, Jun. 1, 2007, total 10 pages, Internet<URL:http://www.ieice.org/iss/de/DEWS/DEWS2007/pdf/b7-4.pdf, English Abstract included.

* cited by examiner

FIG.6A
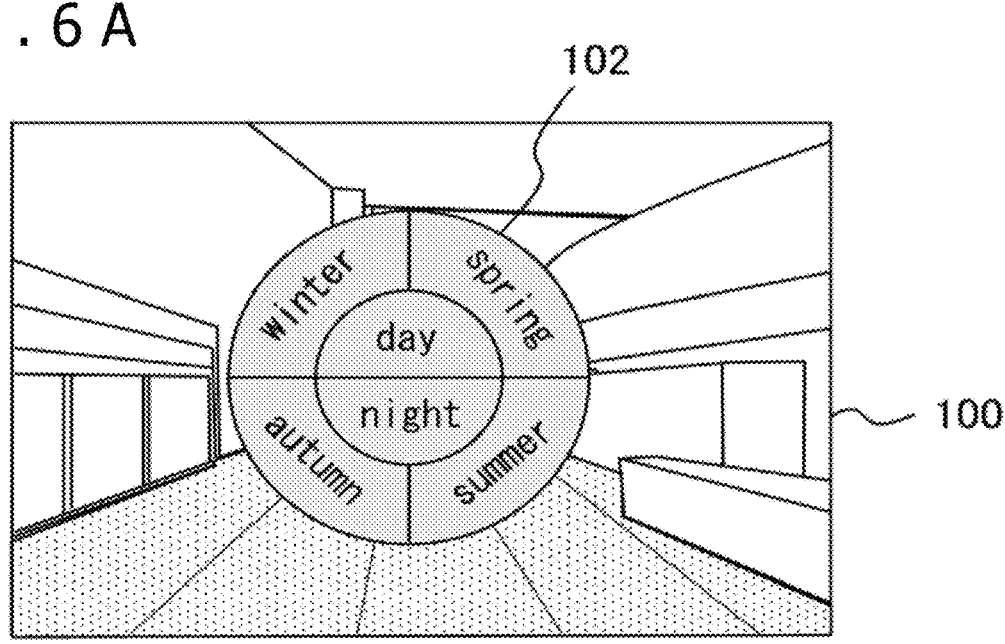
FIG.6B
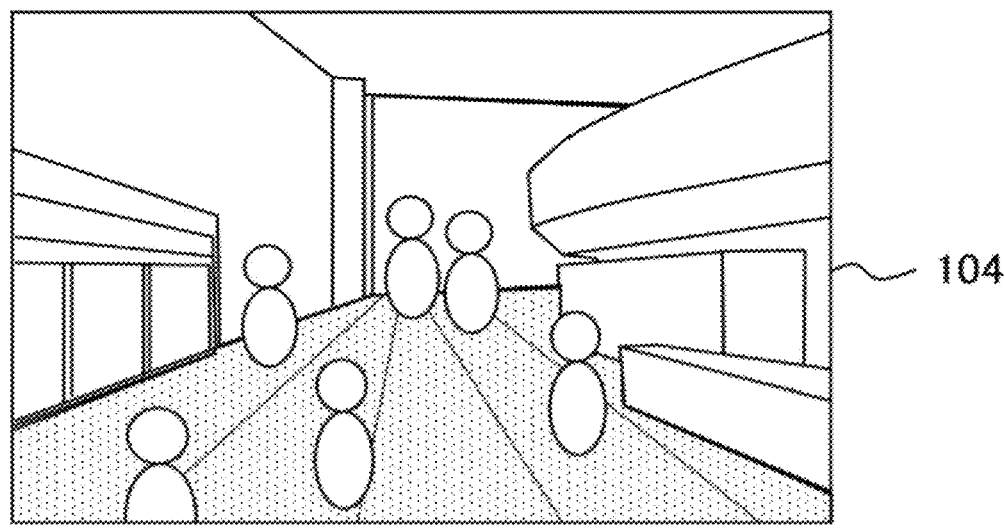
FIG.7
| POSITION | ADDRESS | FACILITY ID | IMAGE DATA | DATE AND TIME OF SHOOTING | EVENT |
|---|---|---|---|---|---|
| 35.6, 139.7 | TOKYO, CHIYODA WARD,... | City Center | 0001 | 2018.02.05/ 23:10 | — |
| | | | 0002 | 2008.05.16/ 10:40 | MERCHANDISE EXHIBITION |
| | | | 0003 | 2017.10.10/ 12:30 | ART EXHIBITION |
| | | | 0004 | 1930.05.05/ — | — |
| ... | ... | ... | ... | ... | ... |

| POSITION 132 | ADDRESS 134 | FACILITY ID 136 | TIME ZONE 138 | SEASON 140 | EVENT CLASSIFICATION 142 |
|---|---|---|---|---|---|
| 35.5, 139.7 | TOKYO, CHIYODA WARD,... | City Center | DAY TIME/NIGHT TIME | SPRING/-/AUTUMN/WINTER | EXHIBITION/CONCERT |
| ... | ... | ... | ... | ... | ... |

130

| POSITION 152 | ADDRESS 154 | FACILITY ID 156 | FLOOR 158 | IMAGE DATA 160 |
|---|---|---|---|---|
| 35.5, 139.7 | TOKYO, CHIYODA WARD,... | City Center | B2 | 0001,0002 |
| | | | B1 | 0003 |
| | | | 1 | 0004,0005,0006 |
| | | | 2 | 0007,0008 |
| | | | 3 | 0009 |
| ... | ... | ... | ... | ... |

150

IMAGE PROCESSING DEVICE, IMAGE PROVIDING SERVER, IMAGE DISPLAY METHOD, AND IMAGE PROVISION METHOD FOR NAVIGATING HORIZONTALLY OR VERTICALLY BETWEEN FLOOR IMAGES

CROSS REFERENCE TO RELATED APPLICATIONS

This application claims the benefit of Japanese Priority Patent Application JP 2019-076503 filed Apr. 12, 2019, the entire contents of which are incorporated herein by reference.

BACKGROUND

The present disclosure relates to an image processing device that causes a display to display thereon an image, an image providing server that provides image data, an image display method, and an image provision method.

Accessing suitable information regardless of the time and the place has been facilitated by the advancement of networks and information processing devices. For example, according to an application for a map, information regarding a facility present at a position specified on the map, a shot image of this place, and the like can immediately be viewed and perception thereof in association with position information that the map intrinsically has is enabled. Moreover, a sense of presence allowing a user to feel as if the user looks around the surroundings or walks in an image world can also be provided, for example, by causing an image in an optional direction to be displayed using a whole-sky (360°) shot image, or by sequentially switching the display to images shot from viewpoints in a travelling direction.

SUMMARY

To stably present an environment as described above, it is desirable to prepare as many shot images as possible regardless of the place. A measure may therefore be taken for users to share images through a network, for example, by asking the public for data of images, by permitting individual users to associate an image with a position on a map. If the number of images involved is increased, however, images having appearances completely different from each other even for a same place are handled in the same manner, and the possibility becomes higher that viewers get confused or that it takes a lot of effort to reach a desired image. Especially in a case where displayed images are sequentially switched over, like the above-described technique of moving the viewpoint for the whole-sky image, the sense of presence may be degraded or it may be difficult to recognize images as the same place because the appearances of the images acquired before and after the switching are different from each other.

The present disclosure has been made in view of the above circumstances, and it is desirable to provide a technique capable of causing an image corresponding to a place to be displayed suitably and efficiently.

According to an embodiment of the present disclosure, there is provided an image processing device including an input information acquiring part that receives a user operation relating to an image displayed on a displaying device, and an image displaying part that, when the input information acquiring part receives an operation for specifying a place by a user, causes the displaying device to display thereon an image of the place. The image displaying part further causes an icon for floor number selection for selecting a floor number of a building currently displayed to be displayed and, when the input information acquiring part receives an operation, which is performed on the icon for floor number selection, for selecting another floor, changes display such that an image of the selected floor appears from a direction same as a direction corresponding to the selected floor in a vertical positional relation between the selected floor and a floor currently displayed.

According to another embodiment of the present disclosure, there is provided an image providing server that establishes communication with an image processing device operated by a user and transmits to the image processing device data of an image of a place specified by the user on the image processing device. The image providing server includes a database in which the number of floors of a building and positions on each of the floors are associated with images of the respective positions, and a data transmitting part that, in accordance with a user operation for selecting one of the floors and a position currently displayed on the image processing device, reads out data of an image of a same position of the floor from the database and transmits the data to the image processing device.

According to a further embodiment of the present disclosure, there is provided an image display method by an image processing device, including: receiving a user operation relating to an image displayed on a displaying device; when an operation for specifying a place by a user is received, causing the displaying device to display thereon an image of the place; causing an icon for floor number selection for selecting a floor number of a building currently displayed to be displayed; and when an operation, which is performed on the icon for floor number selection, for selecting another floor is received, changing display such that an image of the selected floor appears from a direction same as a direction corresponding to the selected floor in a vertical positional relation between the selected floor and a floor currently displayed.

According to a yet further embodiment of the present disclosure, there is provided an image provision method by an image providing server, including: establishing communication with an image processing device operated by a user and transmitting to the image processing device data of an image of a place specified by the user on the image processing device; and from a database in which the number of floors of a building and positions on each of the floors are associated with images of the respective positions, in accordance with a user operation for selecting one of the floors and a position currently displayed on the image processing device, reading out data of an image of a same position of the floor and transmitting the data to the image processing device.

Note that any combinations of the foregoing constituent elements and any conversions of expressions of the embodiments of the present disclosure, for example, between methods, devices, systems, computer programs, recording media having the computer programs recorded therein are also valid modes of the present disclosure.

According to the embodiments of the present disclosure, an image corresponding to a place can be caused to be displayed suitably and efficiently.

BRIEF DESCRIPTION OF THE DRAWINGS

FIGS. 6A and 6B are diagrams depicting examples of a screen at a time when selection of a shooting situation is received in the first embodiment;

FIG. 7 is a diagram exemplifying a structure of data to be stored in the image database in the first embodiment;

DETAILED DESCRIPTION OF THE PREFERRED EMBODIMENTS

First Embodiment

Figure 1:
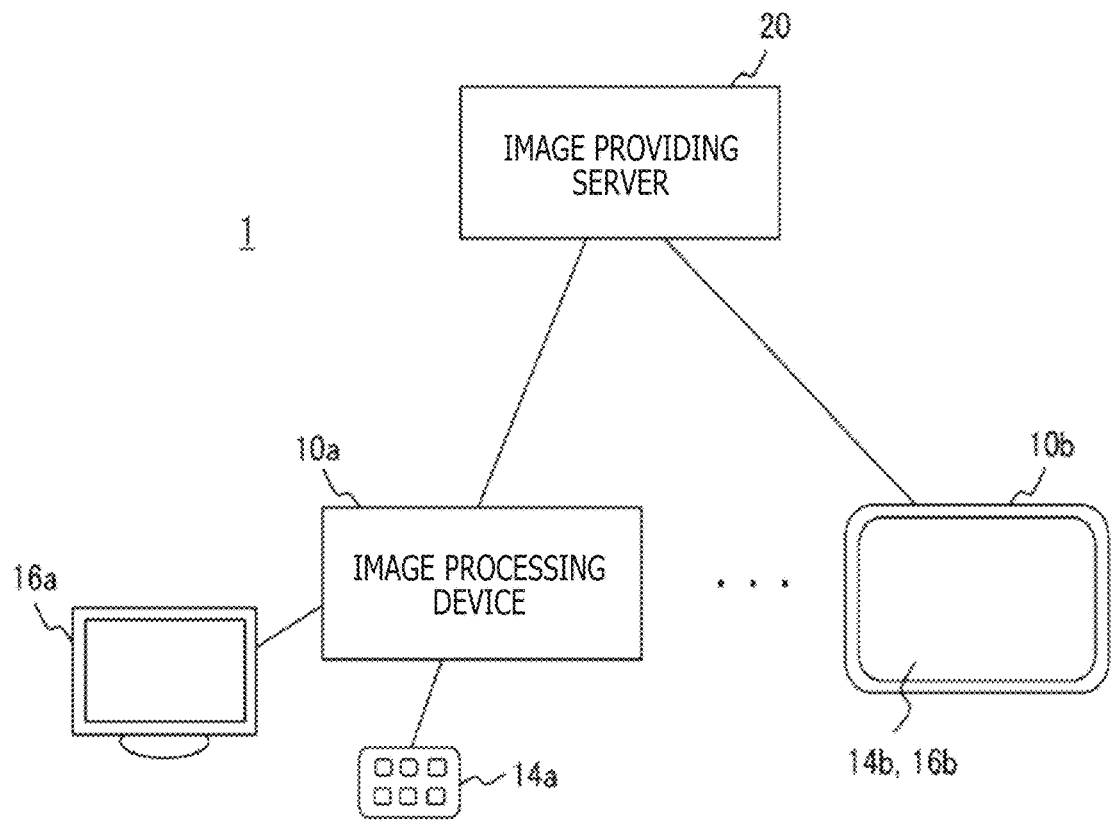
FIG. 1 is a diagram depicting a configuration example of an image display system to which a first embodiment of the present disclosure is applicable.

FIG. 1 depicts a configuration example of an image display system to which this embodiment is applicable. An image display system 1 includes image processing devices 10a and 10b that each cause an image to be displayed in accordance with a user operation, and an image providing server 20 that provides image data used for display. To the image processing devices 10a and 10b, input devices 14a and 14b for user operations, and displaying devices 16a and 16b that each display thereon an image are connected, respectively. The image processing devices 10a and 10b, and the image providing server 20 establish communication therebetween through a wide area communication network such as the Internet or a local network such as a local area network (LAN). Alternatively, provision of image data from the image providing server 20 to the image processing devices 10a and 10b may be executed through a recording medium.

The image processing devices 10a and 10b, and the displaying devices 16a and 16b and the input devices 14a and 14b may be connected to each other in a wired or wireless manner, respectively. Alternatively, two or more of these devices may be integrally formed with each other. For example, in the depicted example, the image processing device 10b employs a touch pad that covers a screen of the displaying device 16b as the input device 14b and configures a mobile terminal integrally with the input device 14b and the displaying device 16b. Moreover, the displaying device 16a is not limited to a flat panel display, and may be a wearable display such as a head-mounted display, a projector, or the like.

As above, an outer appearance shape and a connection form of each of the depicted devices are not limited. The number of the image processing devices 10a and 10b connected to the image providing server 20 is also not limited. Hereinafter, the image processing devices 10a and 10b will generically be referred to as "image processing device 10," the input devices 14a and 14b will generically be referred to as "input device 14," and the displaying devices 16a and 16b will generically be referred to as "displaying device 16."

The image processing device 10 causes the displaying device 16 to display thereon an image that corresponds to a user operation performed on the input device 14. More specifically, the displaying device 16 displays thereon at least a shot image of a place specified by the user from among images shot in various places. Concerning the above, the purpose of the display is not especially limited and, to accomplish this purpose, the image processing device 10 may concurrently execute a general process of proceeding with an electronic game, causing a browser to display an image of an Internet website, or the like. In this embodiment, the description will be made taking as an example an application for an electronic map having high compatibility as a mechanism for specifying a place.

The input device 14 may be any of or a combination of general input devices such as a controller, a keyboard, a mouse, a touch pad, and a joystick. In this embodiment, especially, the input device 14 receives from the user selection of a shooting situation of an image in addition to specification of a place, a movement of a viewpoint, and turning of a line of sight. The displaying device 16 may be a general display such as a liquid crystal display, a plasma display, or an organic electroluminescence (EL) display, and displays thereon an image output from the image processing device 10. As described above, the displaying device 16 may be a head-mounted display or a projector.

The image providing server 20 establishes communication with the image processing device 10 and transmits data of a shot image in accordance with a request from the image processing device 10. The image providing server 20 therefore retains therein a database that has data of the shot image associated with its shooting place and its shooting situation. In addition, the image providing server 20 receives specification of the shooting place and the shooting situation from the image processing device 10, and transmits data of an image that matches therewith. Concerning the above, as the "shooting situation," for example, a temporal situation such as the date and time, a time zone, the day of the week, the month, the season, the year, or a period of ten years, at/in which the shooting is executed, or a situation of an object such as a name of an event that takes place when the shooting is executed, a classification of the event, the number of people appearing in the shot image, and the weather are conceivable. Note that specific items are not especially limited as long as the items are factors that each vary the appearance and the impression of the place.

Figure 2:
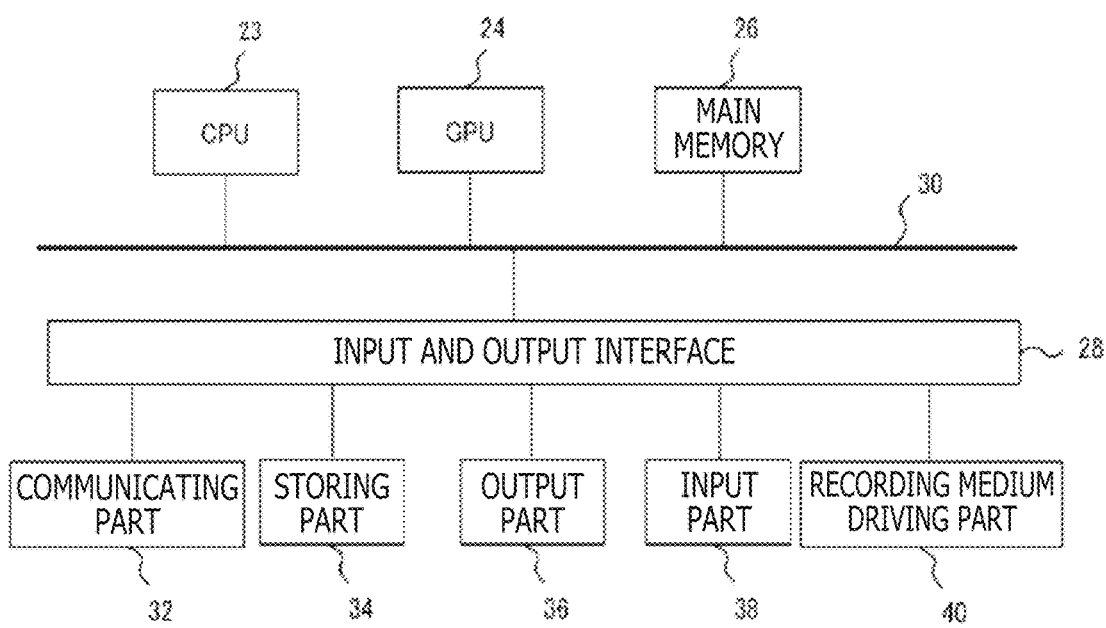
FIG. 2 is a diagram depicting an internal circuit configuration of an image processing device in the first embodiment.

FIG. 2 depicts an internal circuit configuration of the image processing device 10. The image processing device 10 includes a central processing unit (CPU) 23, a graphics processing unit (GPU) 24, and a main memory 26. These parts are connected to each other through a bus 30. An input and output interface 28 is further connected to the bus 30. Such parts are connected to the input and output interface 28, as a communicating part 32 that includes a peripheral apparatus interface such as the universal serial bus (USB) or the IEEE 1394 (IEEE: Institute of Electrical and Electronics Engineers) and a network interface of a wired or wireless LAN, and that establishes communication with the image providing server 20, a storing part 34 such as a hard disk drive or a non-volatile memory, an output part 36 that outputs data to the displaying device 16, an input part 38 that receives inputs of data from the input device 14, and a recording medium driving part 40 that drives a removable recording medium such as a magnetic disk, an optical disc, or a semiconductor memory.

The CPU 23 controls the overall image processing device 10 by executing an operating system stored in the storing part 34. Moreover, the CPU 23 executes various programs that are read out from the removable recording medium and loaded on the main memory 26 or that are downloaded through the communicating part 32. The GPU 24 has a function of a geometry engine and a function of a rendering processor, executes a drawing process in accordance with a drawing order from the CPU 23, and outputs the result thereof to the output part 36. The main memory 26 includes a random access memory (RAM) and stores therein programs and data that are used for the processing. Note that an internal circuit configuration of the image providing server 20 may be similar to the above.

Figure 3:
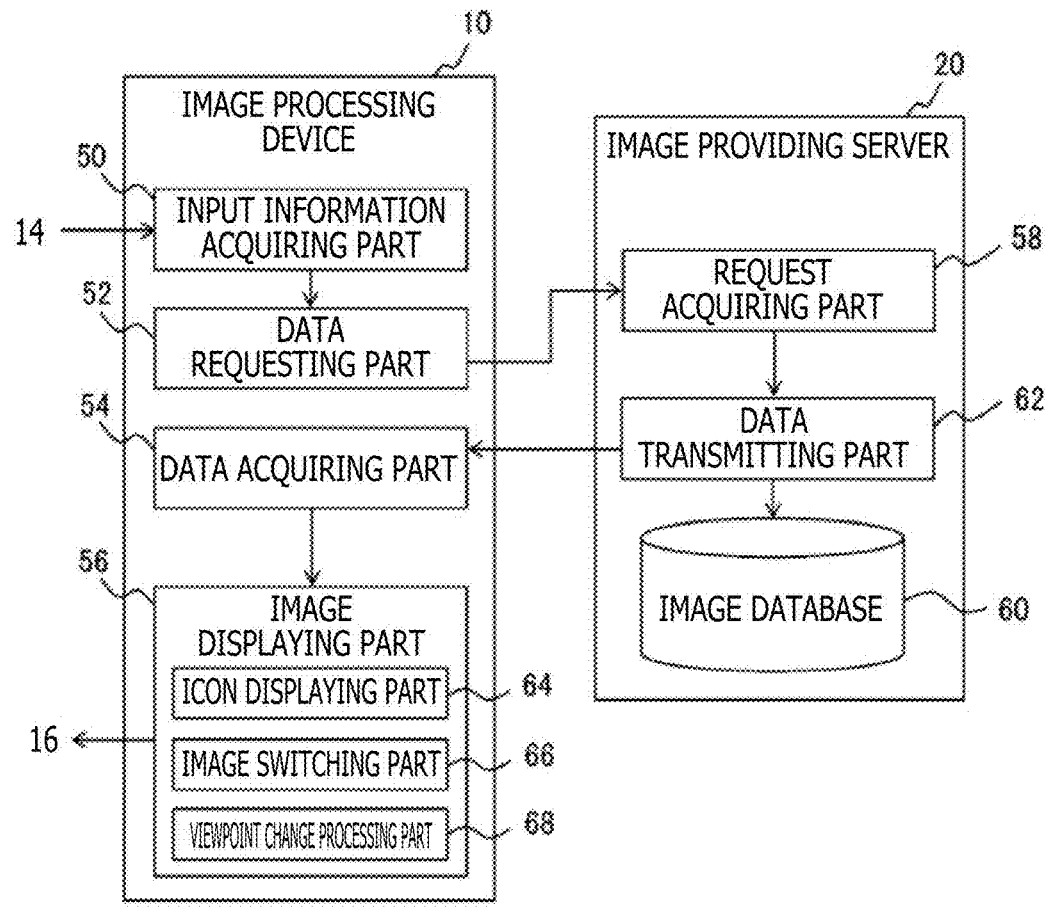
FIG. 3 is a diagram depicting a configuration of functional blocks of the image processing device and an image providing server in the first embodiment.

FIG. 3 depicts a configuration of functional blocks of the image processing device 10 and the image providing server 20. The functional blocks depicted in this drawing and FIG. 4 described later can be realized by the various types of circuits depicted in FIG. 2 in terms of hardware, and are realized by programs that exert functions such as an image analyzing function, an information processing function, an image drawing function, and a data input and output function and that are loaded from a recording medium onto the main memory, in terms of software. Those skilled in the art should therefore understand that these functional blocks can be realized in various forms by only hardware, only software, or a combination of these, and the form is not limited to any of the above.

The image processing device 10 includes an input information acquiring part 50 that acquires information relating to an user operation, a data requesting part 52 that requests the image providing server 20 for data according to the user operation, a data acquiring part 54 that acquires data transmitted from the image providing server 20, and an image displaying part 56 that generates a display image and causes the displaying device 16 to display thereon the display image. The input information acquiring part 50 is realized by the input part 38, the CPU 23, and the like in FIG. 2, and acquires information according to the user operation from the input device 14. More specifically, as described above, the input information acquiring part 50 acquires contents of the operation such as a start and an end of a display process, turning of the line of sight with respect to a whole-sky image, and a movement of the viewpoint in addition to specification of the shooting place and the shooting situation of an image. In a case where a map application is associated, the input information acquiring part 50 further acquires contents of various operations relating to a map display.

The data requesting part 52 is realized by the CPU 23, the communicating part 32, and the like in FIG. 2, and requests the image providing server 20 for data of an image that corresponds to the user operation. The data acquiring part 54 is realized by the CPU 23, the communicating part 32, the main memory 26, and the like in FIG. 2, and acquires data of the image transmitted from the image providing server 20 in accordance with the request. Note that the data acquiring part 54 may include the recording medium driving part 40 and may read out data of an image from a recording medium. Moreover, the data acquiring part 54 may also acquire from the image providing server 20 information regarding the options that indicate of what shooting situation an image can be selected for a specified place. The data acquiring part 54 decodes and decompresses the acquired image data as appropriate.

The image displaying part 56 is realized by the CPU 23, the GPU 24, the main memory 26, and the like in FIG. 2, generates a display image that includes an image acquired by the data acquiring part 54, and outputs the display image to the displaying device 16. More specifically, the image displaying part 56 includes an icon displaying part 64, an image switching part 66, and a viewpoint change processing part 68. The icon displaying part 64 displays at least an icon for situation selection for selecting the shooting situation of an image to be displayed. By causing the icon for situation selection to be displayed in a superimposed manner on the image currently displayed, the display can be switched to an image of another shooting situation while maintaining the image-displaying state. Note that the selectable shooting situations vary depending on the images prepared for the specified place, and the icon displaying part 64 therefore determines a configuration of the icon for situation selection on the basis of the information regarding the options transmitted from the image providing server 20 as described above.

In addition to the above, the icon displaying part 64 displays an icon for movement for causing the viewpoint to movement in a whole-sky image display in a superimposed manner on the image currently displayed as appropriate. The image switching part 66 switches the display target to at least an image of the shooting situation selected by an operation for the icon for situation selection. In addition to the above, the image switching part 66 appropriately executes display of thumbnail images, enlarged display of a selected image of the displayed thumbnail images, display of a map of or information regarding a retrieved place, and the like. The viewpoint change processing part 68, for example, switches a display image such that the viewpoint moves in a corresponding direction in an image world in accordance with an operation for the icon for movement in a whole-sky image display, or changes a field of view with respect to the display target such that a corresponding direction can be seen in accordance with a direction specifying operation for an upward, a downward, a rightward, a leftward, or an oblique direction on the screen.

A general technique can be used for the display control itself for changes of the viewpoint and the line of sight, that is executed by the viewpoint change processing part 68. In this embodiment, however, when the image is switched by a viewpoint moving operation, an image of the same shooting situation as that of the image displayed before the switching is selected preferentially and is displayed. Alternatively, the user is enabled to select the shooting situation on the spot. Note that, in a case where the display target is not a whole-sky image, the function of the viewpoint change processing part 68 can be omitted.

The image providing server 20 includes a request acquiring part 58 that acquires a request for image data from the image processing device 10, a data transmitting part 62 that transmits to the image processing device 10 the data of the image that corresponds to the request, and an image database 60 that stores therein the data of the image in association with the shooting place and the shooting situation thereof. The request acquiring part 58 is realized by the communicating part 32, the CPU 23, and the like in FIG. 2, and acquires from the image processing device 10 a data request for an image for which the place and the shooting situation are specified.

The data transmitting part 62 is realized by the CPU 23, the communicating part 32, and the like, extracts from the image database 60 data of an image corresponding to the request and information regarding options, and transmits these to the image processing device 10. Note that, in the case where a map application is implemented, the data generally provided as a map application may be included such as an image of a map and information regarding a facility, as the target of a request from the image processing device 10 or as the target of transmission from the image providing server 20. In this case, although those databases are separately prepared, the databases are omitted from the illustration in FIG. 3.

The image database 60 is realized by the storing part 34 in FIG. 2, and stores therein data of images shot in various places in association with the shooting places and the shooting situations thereof. Temporal situations and situations of an object are considered as above as the shooting situations. As the options for selecting from the former, time ranges in various granularities are prepared such as a time zone of a day in which shooting is executed, the month or the season in which the shooting is executed, and a period of ten years in which the shooting is executed. As the options for selecting from the latter, classifications and ranges of the number in various granularities are prepared for an event taking place, the number of people, the weather, and the like.

Figure 4:
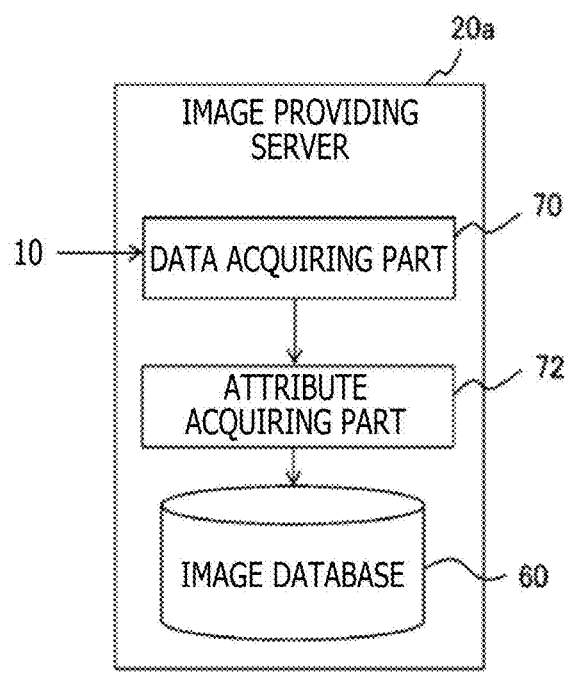
FIG. 4 is a diagram depicting an example of the configuration of the functional blocks of the image providing server at a time when an image database is constructed in the first embodiment.

FIG. 4 depicts an example of the configuration of the functional blocks of the image providing server 20 at the time when the image database 60 is constructed. The functional blocks of an image providing server 20a depicted may be included in the image providing server 20 in FIG. 3 or may be implemented as a different device. The image providing server 20a includes a data acquiring part 70 that acquires data regarding a shot image from an external device, an attribute acquiring part 72 that acquires attributes of a shot image such as the shooting place and the shooting situation, and the image database 60 depicted in FIG. 3.

The data acquiring part 70 is realized by the CPU 23, the communicating part 32, the input part 38, and the like in FIG. 2, and acquires data of a shot image from an external device such as the image processing device 10. For example, a setting is made in advance such that, to a map application executed by the image processing device 10, a general user can specify a place on the map and thereafter can upload data of an image shot by the user at this place. In this case, the data acquiring part 70 acquires the uploaded data together with the information regarding the specified place through the network. In addition to this, the acquisition source of image data may be an imaging device or an information processing device that is directly connected to the image providing server 20a, another image providing server connected through the network, or the like.

The attribute acquiring part 72 acquires information relating to the shooting place and the shooting situation of an image using a predetermined mechanism. In the case of an image shot by a digital camera, the date and time of the shooting, position information at the time of the shooting, and the like are recorded as additional information in an exchangeable image file format (Exif) or the like. The attribute acquiring part 72 therefore reads out the additional information from the image data acquired by the data acquiring part 70 and acquires suitable information. Alternatively, the attribute acquiring part 72 may acquire information relating to attributes that is input on the image processing device 10 by the user who is an image provision source. Alternatively, the attribute acquiring part 72 may acquire information such as the number of people appearing in the shot image and the weather by analyzing the shot image using a general approach. The user operating the image providing server 20a may directly check these pieces of information and may input these pieces of information.

The attribute acquiring part 72 associates the information relating to the shooting place and the shooting situation acquired in this manner with the data of the shot image, and stores them in the image database 60. A shot image most suitable for the situation at the time of viewing can easily be extracted from a lot of shot images by in advance executing such association as above for the data of images that have no uniformity like those gathered from general users to thereby create a database.

For example, in a case where a whole-sky image of a certain place is caused to be displayed and a movement is attempted in a travelling direction in the image world by an operation that causes the viewpoint to move, if the image data is originally insufficient and there is no available shot image of the corresponding viewpoint, it is difficult to switch the display. On the other hand, even in a case where there are a lot of images shot from the corresponding viewpoint, if one of these images is irrelevantly displayed, the possibility that the appearance of the displayed image significantly changes even by a slight movement becomes high, and this may become a cause of an uncomfortable feeling and confusion.

As described above, the image database 60 is created also in association with the attributes other than the place, and images of the same shooting situation are extracted in response to an operation of moving the viewpoint. This enables images having uniformity to be consecutively displayed and the atmosphere and the structure of the place can be appreciated and checked without confusion. Moreover, images suitable for the purpose of each user can be consecutively presented by enabling the user to select the shooting situation. Note that, in a case where the image data is provided using a recording medium, the image data is stored in the recording medium in a format of the image database 60.

Figure 5A:
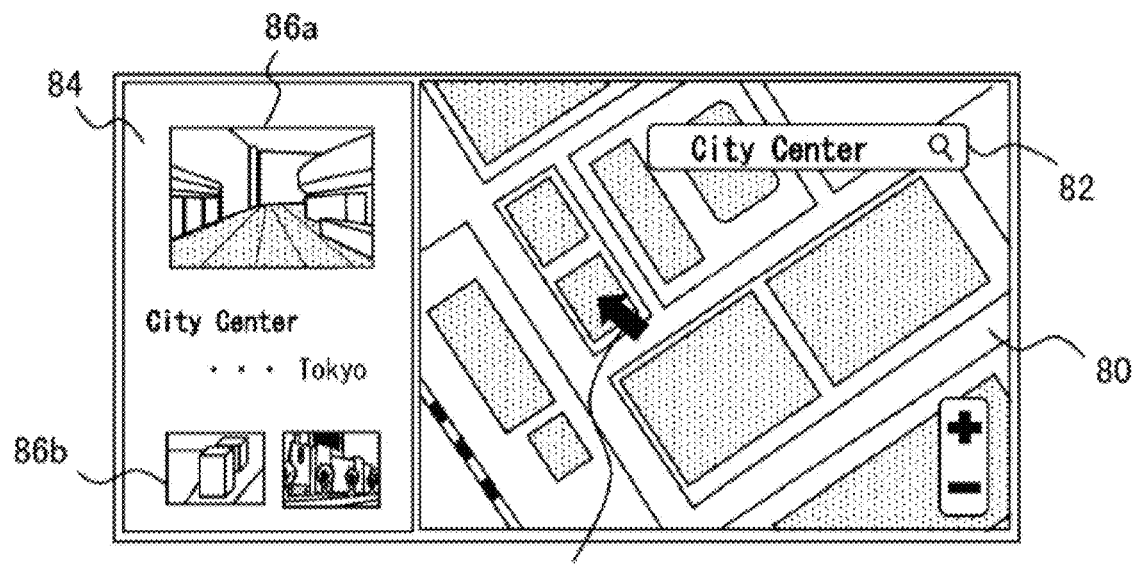
FIGS. 5A and 5B are diagrams depicting examples of a screen that is displayed on a displaying device in the first embodiment.
Figure 5B:
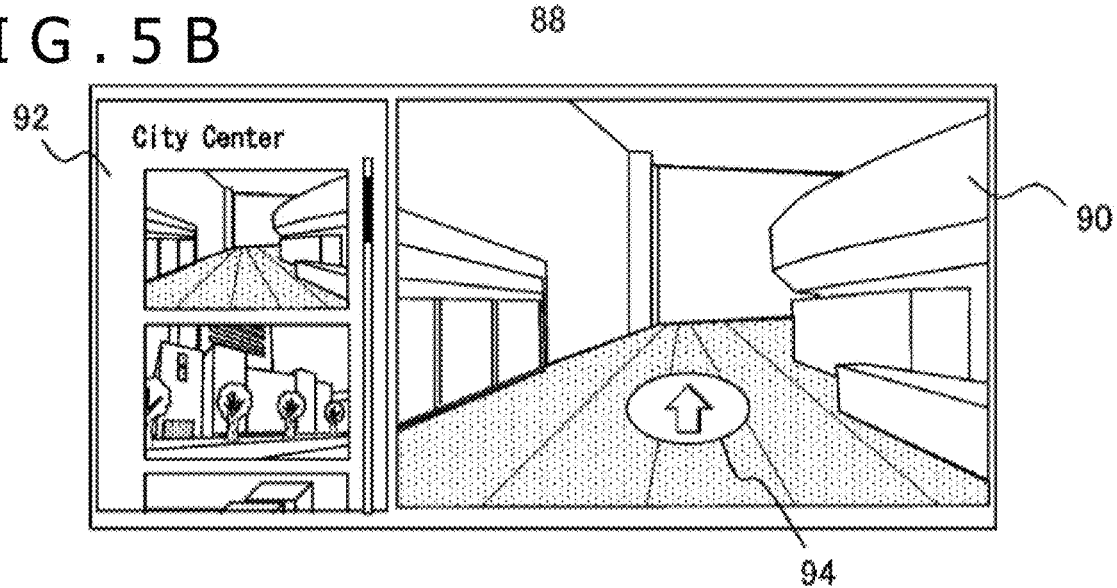

FIGS. 5A and 5B depict examples of a screen that is displayed on the displaying device 16 in this embodiment. Note that, hereinafter, although changes of the display screen to be described take place in practice after a process procedure in which the input information acquiring part 50 of the image processing device 10 acquires contents of a user operation, the data requesting part 52 requests the image providing server 20 for data, and, as a result, the data acquiring part 54 acquires the corresponding image data, the description thereof is appropriately omitted.

FIG. 5A depicts a screen in a state where an electronic map is displayed by a map application. In this example, the display screen includes a map field 80, a search field 82, and an information field 84. When the user inputs an address or a facility name into the search field 82, the image switching part 66 of the image displaying part 56 displays a map of the vicinity thereof in the map field 80. In a case where a facility name is input or in a case where a certain facility is designated by an operation of a cursor 88 on a map that is already displayed, the image switching part 66 displays basic information regarding the facility and character information such as a uniform resource locator (URL) of a webpage thereof, in the information field 84.

In the depicted example, a facility name "City Center" is input into the search field 82, and a map of the vicinity thereof is displayed in the map field 80 and the basic information is displayed in the information field 84. Furthermore, the image switching part 66 displays thumbnails 86a and 86b of images that are shot near the facility. The images displayed as the thumbnails 86a and 86b are the images extracted, using the place where the facility exists as a key, from among the image data stored in the image database 60. When the user designates either one of the thumbnails using the cursor 88 or the like, the screen transitions to a shot image display screen depicted in FIG. 5B. In this example, the shot image display screen includes an image field 90 and a thumbnail field 92.

The image switching part 66 displays in an enlarged manner the image of the thumbnail 86a selected by the user in the map display screen depicted in FIG. 5A in the image field 90, and displays thumbnails of the other shot images acquired by shooting the same place in the thumbnail field 92. Note that, concerning the above, the scale of the range of "the same place" is not limited and may include a building, a facility, or a site in addition to the inside of the same store or the same room. When either one of the thumbnails displayed in the thumbnail field 92 is designated, the image switching part 66 switches the display in the image field 90 to an enlarged image of the designated thumbnail.

Moreover, in a case where a whole-sky image is displayed in the image field 90, the icon displaying part 64 of the image displaying part 56 displays in this image an icon 94 for movement to realize a viewpoint movement. When the icon 94 for movement is designated by the cursor or the like, the viewpoint change processing part 68 causes the viewpoint to move in a direction of an arrow indicated by the icon (a direction toward the back in the drawing), and switches the display to a whole-sky image shot there. Moreover, when an operation of designating an optional position on the screen and sliding the position is executed, the viewpoint change processing part 68 causes the field of view to move in a direction opposite to the direction of sliding such that the image moves in association with the sliding. This enables the user to view an appearance of a specified place from an arbitrary viewpoint in an arbitrary line of sight. Note that the configuration of the screen is not limited to the one depicted in FIGS. 5A and 5B, and the procedure for the process of causing shot images to be displayed is not limited either.

In an environment where a place is selected and a shot image captured there is caused to be displayed in this manner, it is intended to appreciate the image itself and, in addition, it is often intended to recognize the appearance of the place in association with a facility or a position. As described above, however, as the number of images acquired by shooting the place is increased, more various images can be checked while accessing a desired image tends to be more difficult. Moreover, when the viewpoint is moved using the icon 94 for movement, if the appearance significantly changes between the images displayed before and after the movement, the user may not be able to feel as if he/she had moved and spatial perception may be difficult.

As described above, therefore, a shot image in a situation suitable for the purpose of the user is extracted and displayed. FIGS. 6A and 6B depict examples of a screen at the time when an operation of selecting the shooting situation is received. An image 100 depicted in FIG. 6A may be a thumbnail displayed on the map display screen in FIG. 5A, a thumbnail displayed on the shot image display screen in FIG. 5B, or an enlarged image displayed on the shot image display screen in FIG. 5B. Alternatively, the image 100 may also be a shot image displayed in a webpage in no relation to the map. In a state where such an image 100 is displayed, when the user performs a predetermined operation on the image 100, the icon displaying part 64 displays an icon 102 for situation selection that represents options for the shooting situation in a superimposed manner on the image 100.

In a general image display technique, a setting is often made such that the displayed image 100 is designated using a cursor or the like, this image is thereby selected, and some action is started up. For example, in the example in FIGS. 5A and 5B, as described above, the thumbnail 86a is designated and the enlarged image thereof is thereby displayed in the image field 90. Alternatively, the designating operation for an image displayed in the image field 90 is used for moving the viewpoint or turning the line of sight.

To enable an operation of the present embodiment concurrently with such a general operation described above, making it a condition that designation in a predetermined range that is regarded as the same position on the image 100 continues for a time period equal to or longer than a predetermined threshold value t1, the icon displaying part 64 displays the icon 102 for situation selection at the designated position. Concerning the above, "designation" may be an operation of a displayed cursor or may be a contact operation on a touch pad. In the case of the former, the duration of the designation corresponds to, for example, a pressing-down time period of a button of the controller or the mouse. In the case of the latter, the duration of the designation corresponds to the duration of the contact. These operations are generally referred to as "long pressing-down operations." Note that the operation of calling for the icon 102 for situation selection is not limited to the long pressing-down operation. For example, another graphical user interface (GUI) may be displayed in advance, and the icon 102 for situation selection may be displayed in response to an operation made on this GUI.

As an example, the icon 102 for situation selection is depicted in FIG. 6A as a circular icon that includes daytime and nighttime ("day" and "night") and the four seasons ("spring," "summer," "autumn," and "winter") as the options for the shooting situation in respective assigned areas. In this case, for example, at the time point at which a long pressing-down operation is detected, the icon 102 for situation selection is displayed centered at the position of the pressing-down operation and, if the designated position is directly slid to any of the areas, it is determined that the option in the area that includes an arrival point of the sliding is selected. Moreover, even in a case where the icon 102 for situation selection is displayed, if the designated position does not move and this state continues for a time period equal to or longer than a predetermined threshold value t2, another icon 102 for situation selection that indicates other options may be displayed.

Instead of additionally displaying another icon 102 for situation selection, the already displayed icon may be expanded in accordance with the duration of the designation to increase the options. For example, when the icon 102 for situation selection is displayed for the first time, only the options arranged in a central area thereof (the options of "day" and "night" in the depicted example) are displayed. A setting may further be made such that, in a case where the designation continues for a time period equal to or longer than the threshold value t2 with the designated position not moving even after these options are displayed, the options in the areas on the outer side thereof (the options of "spring," "summer," "autumn," and "winter" in the depicted example) appear. If any of the shooting situations is thereafter selected, the image switching part 66 switches the display to an image acquired by shooting the same place in the selected shooting situation as depicted in FIG. 6B.

For example, the number of people as objects is increased as depicted as a result of switching from an image shot in the nighttime to an image shot in the daytime. Note that, from among the options for the shooting situation indicated by the icon 102 for situation selection, regarding an option for which no image data exists, it is notified that the option cannot be selected by changing the color of the option from that of the other options, for example. The image after the switching may be displayed at the same position as that of the image before the switching, or may be displayed at another position depending on the purpose. For example, in a case where the image 100 is the thumbnail 86a indicated in the information field 84 on the map display screen in FIG. 5A, the image of the selected shooting situation may be displayed in an enlarged manner in the image field 90 on the shot image display screen in FIG. 5B.

In this case, when the user causes the viewpoint to move by operating the icon 94 for movement, all of the images of the movement destination that are displayed while being switched by the viewpoint change processing part 68 may be images of the shooting situation that is first selected. The shooting situation of the images sequentially switched for the movement is thereby unified, and a state where images whose appearances are completely different from each other are displayed by a slight movement to incur confusion can be avoided as above. On the other hand, even in a case where the image 100 in FIG. 6A is an image displayed in an enlarged manner in the image field 90, if the icon 102 for situation selection is called for and, as a result, the display is switched to the image of the selected shooting situation, how the same place appears in a different situation can easily be checked.

For example, how the same place changes between the daytime and the nighttime or among the seasons can be checked, and how the place appeared in the past can be checked. Moreover, how an event in which the user is going to participate appeared in the previous time can be checked. When the icon 102 for situation selection is displayed on an image, the image can directly be switched, so that labor and distraction which may be caused by displaying another image such as a search screen or a thumbnail are therefore not generated. Moreover, even with a limited display area, switching, comparison, and the like can easily be performed.

FIG. 7 exemplifies a structure of data to be stored in the image database 60. In this example, image data information 110 includes a position field 112, an address field 114, a facility identification (ID) field 116, an image data field 118, a shooting date and time field 120, and an event field 122. The position field 112 indicates the position information such as the latitude and the longitude of the shooting place, the address field 114 indicates the address of the shooting place, and the facility ID field 116 indicates identification information such as the name of a facility existing at the shooting place. The image data field 118 indicates data of an image shot at this place or in this facility, or identification information thereof. The shooting date and time field 120 indicates the date and time at which this image is shot, and the event field 122 indicates the name of an event held at this place at the time of shooting.

In other words, in the image data information 110, the pieces of image data indicated in the image data field 118 are associated with the "information regarding place" indicated in the position field 112, the address field 114, and the facility ID field 116 and are also associated with the "shooting situation" indicated in the shooting date and time field 120 and the event field 122. Note that the items of the "information regarding place" and the "shooting situation," and the data structure of the image data information 110 are not limited to those of the depicted example. Concerning the above, the shooting situation indicated by the image data information 110 is information specific to the image data and is acquired by Exif, manual inputting, or the like. To efficiently narrow down this information using the icon 102 for situation selection in FIG. 6A, the date and time of the shooting and classification information regarding an event are prepared.

Figures 8, 9, 10:
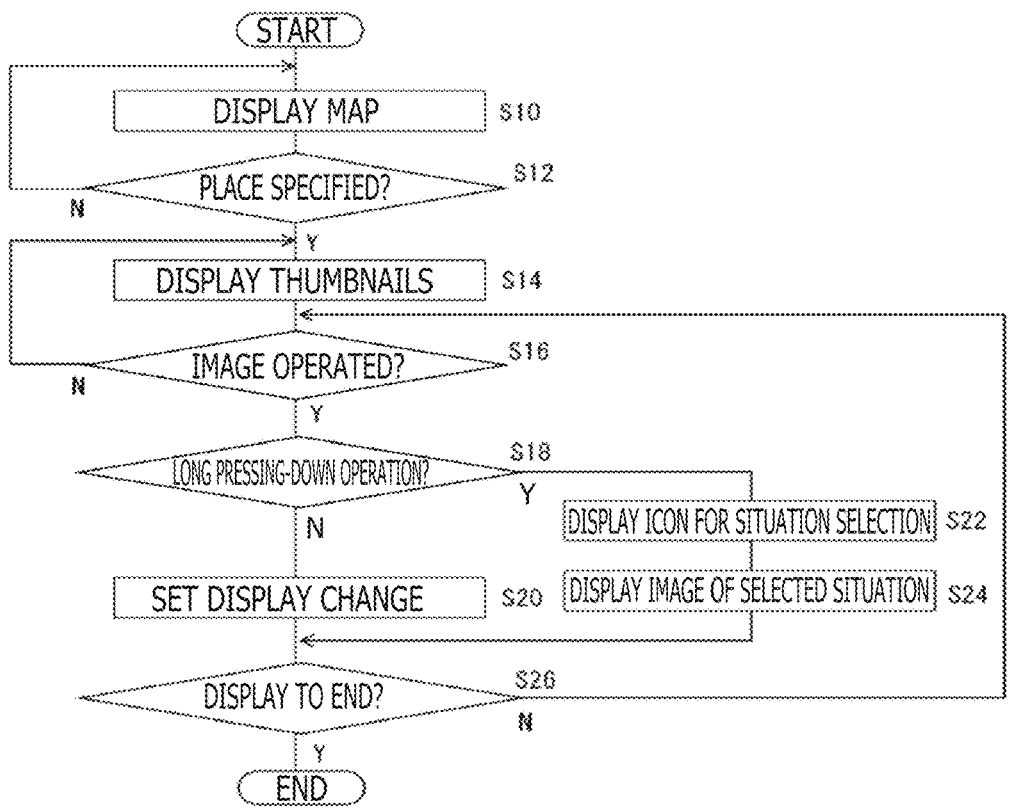
FIG. 8 is a diagram exemplifying a structure of classification information regarding the shooting situation used in the first embodiment.
FIG. 9 is a flowchart depicting a process procedure for the image processing device to display a shot image corresponding to a place in cooperation with the image providing server in the first embodiment.
FIG. 10 is a diagram exemplifying a structure of data to be stored in an image database in a second embodiment.

FIG. 8 exemplifies a structure of the classification information regarding the shooting situation used in this embodiment. In this example, classification information 130 includes a position field 132, an address field 134, a facility ID field 136, a time zone field 138, a season field 140, and an event classification field 142. The position field 132, the address field 134, and the facility ID field 136 respectively indicate the same pieces of information as those in the position field 112, the address field 114, and the facility ID field 116 depicted in FIG. 7. The time zone field 138, the season field 140, and the event classification field 142 respectively indicate the time zone, the season, and the classification of the event that can be indicated as options for the place.

For example, for "City Center" that is depicted, shot images of "daytime" and "nighttime" are present, and images of "spring," "autumn," and "winter" are present for the season while no image of "summer" is present. Moreover, images of events classified into "exhibition" and "concert" are present. Note that the items for classification of the shooting situation are not limited to the above. Narrowing down of the images can efficiently be executed by preparing classification in various granularities for each of the temporal situations and the situations of the object. The classification information 130 is stored in advance in the image database 60 together with the image data information 110 depicted in FIG. 7.

Every time a new shot image is acquired, the attribute acquiring part 72 of the image providing server 20 registers the data of this image into the image data information 110 in FIG. 7 and updates the classification information 130 on the basis of attributes of this image as appropriate. When the image is viewed, the icon displaying part 64 of the image processing device 10 acquires the classification information 130 regarding the specified place from the image providing server 20, and presents the classification of the selectable shooting situations in the icon 102 for situation selection as options.

When any of the options is thereafter selected by the user, the image switching part 66 acquires the data corresponding to the selected shooting situation, from among the pieces of image data associated with this place in the image data information 110, from the image providing server 20 and displays this data. In a case where a plurality of images correspond to the selected shooting situation, one of these images may be displayed in an enlarged manner, and the other images may be displayed as thumbnails. Note that, in practice, the image data information 110 depicted in FIG. 7 and the classification information 130 depicted in FIG. 8 may be integrated with each other as one table or the pieces of image data therein may be associated for each classification.

A process procedure for the image display of this embodiment that is realizable by the above configuration will next be described. FIG. 9 is a flowchart depicting a process procedure for the image processing device 10 to display a shot image corresponding to a place in cooperation with the image providing server 20. Although this flowchart assumes a mode where a shot image is displayed as part of a map application, the process executed in the pre-stage of the image display is not limited to the map display as described above. Moreover, as for the image displayed by the image displaying part 56, basically, this image is requested by the data requesting part 52 and the data of this image transmitted from the image providing server 20 is acquired by the data acquiring part 54 while this procedure is omitted from the description.

When the map application is first started up by a user operation performed on the image processing device 10, the image switching part 66 of the image displaying part 56 displays an image of an electronic map on the displaying device 16 (S10). Until a place is specified by the user inputting the name of a facility that the user desires to search for or designating a position on the map, for example, the image switching part 66 waits while executing a process not depicted in accordance with an operation for the map (N of S12). When a place is specified (Y of S12), as depicted in FIG. 5A, the image switching part 66 displays thumbnails of images acquired by shooting this place together with information regarding this place (S14).

The images displayed here may be images that are selected in accordance with rules determined in advance. Note that, in the example of the map display screen in FIG. 5A, the thumbnail 86a plays the role of a GUI to switch the main display from the map to the shot image, and a GUI for the switching may therefore be displayed instead of the thumbnails depending on the case. When no operation is performed on the displayed image of the thumbnails or the GUI, the image displaying part 56 waits while executing a process not depicted in accordance with an operation for the map (N of S16).

When an operation is performed on the image of the thumbnails or the GUI (Y of S16) and is not a long pressing-down operation such as the above-described one (N of S18), the image switching part 66 executes the display set for this operation such as displaying in an enlarged manner the thumbnail for which the operation is performed, in the image field 90 depicted in FIG. 5B (S20). In a case where an operation is performed on the GUI, an image selected in accordance with a predetermined rule may be displayed in an enlarged manner. When the operation performed on the image of the thumbnails or the GUI is a long pressing-down operation (Y of S18), as depicted in FIG. 6A, the icon displaying part 64 displays the icon 102 for situation selection for selecting the shooting situation at a designated position (S22). If the designated position is directly slid and a certain shooting situation is thereby selected, for example, the image switching part 66 displays an image corresponding to this shooting situation in the image field 90 depicted in FIG. 5B (S24).

When it is unnecessary to cause the display to come to an end by a user operation or the like, the processes at S16 to S24 are repeated (N of S26). Note that, in the second cycle and thereafter, the operation target at S16 is not limited to the image of the thumbnails and may be an image displayed in an enlarged manner in the image field 90. Moreover, the process executed at S20 may be a process corresponding to a change of the viewpoint or the line of sight by the viewpoint change processing part 68, for example, in addition to the displaying of the thumbnail in an enlarged manner by the image switching part 66. Concerning the above, when the display is switched to an image of a viewpoint movement destination, an image of the shooting situation same as that selected immediately previously is selected and is displayed. When it becomes necessary to cause the display to come to an end, all the processes are caused to come to an end (Y of S26).

According to this embodiment described above, when a shot image of a place specified by the user is displayed or during its display, the icon for situation selection for selecting the shooting situation is displayed by a specific operation. In addition, an image shot in the situation selected by this icon operation is set to be the display target. Images of desired appearances even for the same place can thereby efficiently be presented, so that inconvenience attributable to the abundance of images therefore tends to be avoided even when images are collected providing no policy or no constraint. As a result, the user can suitably view shot images of various places and can check the appearances of these places.

Moreover, because an image itself is switched using an icon displayed on this image, distraction is avoided and images can easily be compared with each other in a state where these images are enlarged, compared to displaying a selection menu separately, rearranging the thumbnail images, or the like. Furthermore, in a mode where an image of a place is appreciated from an arbitrary viewpoint in an arbitrary line of sight using a whole-sky image, because images having uniformity can consecutively be displayed for a viewpoint movement, the user is less likely to lose the sense of presence and can check the surroundings without an uncomfortable feeling.

Second Embodiment

The first embodiment is a technique of easily selecting a shooting situation or easily unifying the shooting situations as to the shot images of the same place. In the second embodiment, images of one floor, from among shot images of the same address (the same location on the ground), can be selected in distinction from images of another floor. A map is generally depicted as a diagram acquired by looking down the ground for grasping positional relations in a horizontal direction among facilities and roads. It is therefore difficult to grasp the number of floors of a building and the appearance on each of the floors only using the map. Although maps for the respective floors are prepared in some cases, this is limited to large-scale facilities that need these maps.

Moreover, as described in the first embodiment, in the case where a shot image is displayed using a map as a base point, when images associated with a position in the horizontal direction including the latitude and the longitude and with the name of the overall building are detected at one time, and the images of various floors are displayed in a mixed manner, a lot of labor may be consequently required until images of the desired floor are reached. Especially in a case where a sense of presence is to be presented using a whole-sky image, from a state where the user is present on a certain floor, another state is established by switching the images where the user feels as if he/she had moved to a completely different floor, and the user may have an uncomfortable feeling and get confused. A setting is therefore made such that the shot images are classified in advance in association with the floors of the building, the display is also managed for each of the floors, and a moving operation to a different floor of the same building is received from the user.

A configuration of a system in this embodiment may be similar to that of the image display system 1 depicted in FIG. 1, and configurations of the image processing device 10 and the image providing server 20 may also be similar to those depicted in FIGS. 2 to 4. FIG. 10 exemplifies a structure of data to be stored in the image database 60 in this embodiment. In this example, image data information 150 includes a position field 152, an address field 154, a facility ID field 156, a floor field 158, and an image data field 160. The position field 152, the address field 154, and the facility ID field 156 indicate the same pieces of information as those in the position field 112, the address field 114, and the facility ID field 116 depicted in FIG. 7. The floor field 158 indicates the floor number in a building present in the corresponding place, and the image data field 160 indicates data of an image shot on this floor or identification information thereof.

In this case, for example, the attribute acquiring part 72 depicted in FIG. 4 may identify on which floor an image is shot on the basis of information such as the altitude included in the additional information of the acquired image data, may allow the user who is the image provision source to input the floor number at the time of shooting, or may identify the floor number on the basis of information such as the store name associated by the user. Moreover, the attribute acquiring part 72 in advance identifies the total number of floors of the building indicated in the facility ID field 156 on the basis of the official information of the building and the like, and separately associates this total number. Note that the depicted image data information 150 may be integrated with the image data information 110 depicted in FIG. 7 to establish one database. In this case, the first and second embodiments can concurrently be realized.

Figure 11:
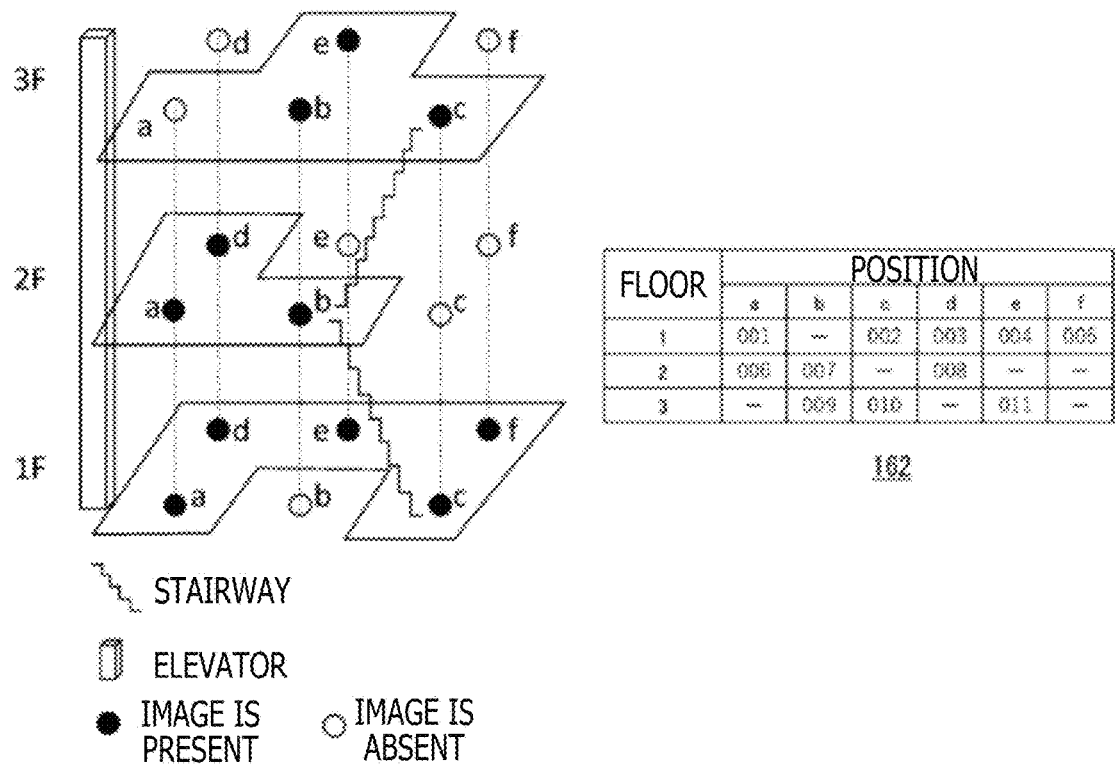
FIG. 11 is a diagram for explaining data to be stored in the image database in a case where positions on respective floors are further associated with image data fields in image data information in FIG. 10.

FIG. 11 is a diagram for explaining data to be stored in the image database 60 in a case where positions on respective floors are further associated with the image data fields 160 in the image data information 150 in FIG. 10. A schematic diagram of the floors of the building is depicted on the left side in this drawing. In this example, the same positions (the same positions in the horizontal direction on the respective floors) a, b, c, d, e, and f on the first floor to the third floor are defined. Of these positions, a black circle denotes a position for which image data is present, and a white circle denotes a position for which no image data is present.

For example, for the positions c, e, and f on the second floor, no image data is present because a corresponding part of the floor is missing due to the open-ceiling structure. There is also a case where no image data is present even when a corresponding part of the floor is present like the position a on the third floor. In a case where the image data is managed according to the defined positions, a table 162 depicted on the right side in FIG. 11 is associated instead of the image data fields 160 depicted in FIG. 10. The table 162 indicates presence or absence of image data for each of the floors and each of the positions. Moreover, in this example, in a case where image data is present, identification information thereof is directly associated therewith like, for example, "001," "002," . . . while linking with the image data may be executed in another table.

By managing the image data for each of the positions on each of the floors in this manner, when an operation for moving from the floor currently displayed to another floor is performed, the display can be switched to an image of the same position on the selected floor. For example, during the display of an image of the position "a" on the first floor, when an operation for moving to the second floor is performed, the display is switched to an image of the position "a" on the second floor. This enables the user to easily recognize to which position on the selected floor the image after the switching corresponds and no confusion occurs in later movements.

Figure 12A:
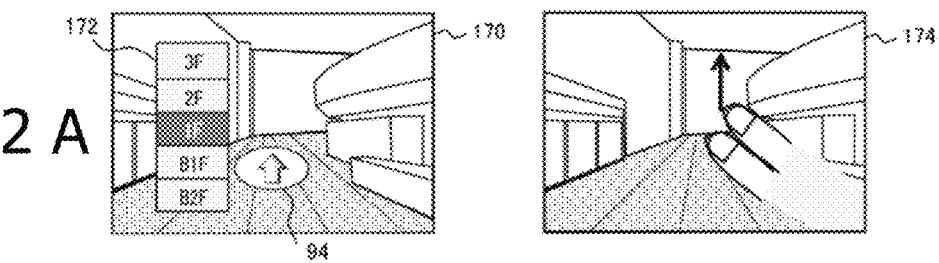
FIGS. 12A to 12C are diagrams depicting examples of an image that is displayed on a displaying device in the second embodiment.
Figure 12B:
Figure 12C:
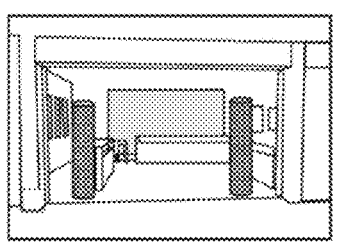

FIGS. 12A to 12C depict examples of an image to be displayed on the displaying device 16 in this embodiment. FIG. 12A depicts a state where a shot image of a certain floor in the building is displayed. These images are displayed in the image field 90 on the shot image display screen in FIG. 5B by the fact, for example, that, as depicted in FIGS. 5A and 5B, an electronic map is displayed by a map application and a predetermined building is specified by a search or a cursor operation. Note that these images are not limited to the images switched to from the map as long as the images are results of specifying a position on the ground such as a building, an address, or the latitude and the longitude.

An image 170 on the left side in FIG. 12A is part of a whole-sky image and, similar to the case of FIG. 5B, the icon 94 for movement to move the viewpoint is displayed therein. In other words, when this icon is designated, the viewpoint moves in the direction of the arrow (toward the back in the drawing) and a whole-sky image present ahead is displayed. In this embodiment, furthermore, a setting is made such that an icon 172 for floor number selection is displayed when a long pressing-down operation is performed on the icon 94 for movement. As an example, the icon 172 for floor number selection is depicted in FIG. 12A as a rectangular icon that includes the second basement ("B2F") to the third floor on the ground ("3F") as the options in respective assigned areas.

The icon displaying part 64 acquires information regarding the total number of floors of the building and information relating to selectable floor numbers for each of which an image is present, from the image providing server 20 and thereby determines the configuration of the icon 172 for floor number selection. For example, areas for all the floor numbers are defined in the icon 172 for floor number selection, and an area for a floor number not selectable is displayed in a color different from that of the other floors to indicate that the floor is not selectable. Moreover, as depicted, the image currently displayed, which is an image of the first floor ("1F") in this example, is also displayed in a color different from that of the other floors on the icon 172 for floor number selection to prevent this floor from being selected.

Note that, as depicted in FIG. 11, in the case where the image data is managed for each of the positions, a floor for which no image data is present for the same position as the position currently displayed may be included in the floor numbers that are not selectable. Alternatively, a floor for which image data is present only for another position may be set to be selectable after acquiring user's approval, by using a further different display color, representing this effect using characters, or the like. The image providing server 20 refers to the table 162 of the image database 60 and also transmits information relating to whether selection of such a position is permitted or not, to the image processing device 10. The user selects a desired floor by designating any option of the icon 172 for floor number selection. Note that the shape and the configuration of the icon 172 for floor number selection are not limited to the above. Moreover, the operation to cause the icon 172 for floor number selection to be displayed is not limited.

In an image 174 on the right side in FIG. 12A, a case is assumed where a touch pad supporting multi-touch operations is disposed as the input device 14 such that the touch pad covers the screen of the displaying device 16. In this case, the viewpoint change processing part 68 of the image displaying part 56 turns the direction of the line of sight with respect to the whole-sky image in accordance with, for example, a swipe operation performed by putting a finger or the like in contact by a single touch (with one contact point) and sliding the finger. Similar to the image 170, the icon 94 for movement may be displayed, and the viewpoint may be moved forward in accordance with a touch operation for this icon.

In this embodiment, furthermore, in accordance with a swipe operation performed by putting fingers in contact by a multi-touch operation (with a plurality of contact points) and sliding the fingers in a direction that can be regarded as an up-and-down direction on the screen, the display is switched to a floor that is associated with this direction and that is one floor above or below. In the depicted example, as indicated by an arrow, the display is switched to an image of the floor that is one floor below by an upward swipe operation. An intuitive operation can thereby be realized with a feeling like moving the floor currently displayed upward. The operations for the viewpoint and the line of sight, and the operations for moving among the floors are distinguished from each other using the number of contact points, and both kinds of operations can thereby be easily achieved.

FIG. 12B depicts an image in a transitional time period at the time when the display is switched to the image of the floor one floor below by the above operation for the image 170 or the image 174. In this example, an image acquired by combining an image 176 before the switching and an image 178 after the switching is presented as the image in the transitional time period. Concerning the above, the images of the two floors are arranged such that these images correspond to the vertical-structural relation between the floors of the building. In other words, the image after the switching is arranged on the lower side of the image before the switching when the floor after the switching is below the floor before the switching, and is arranged on the upper side of the image before the switching when the floor after the switching is above the floor before the switching. A boundary between these images is then moved such that the area of the image after the switching is gradually increased, and a state is thereby presented such that the image after the switching appears from the direction that corresponds to the floor.

For example, the two images may be alpha-blended and an area in which the image 178 after the switching is made transparent ($\alpha=0$) may be gradually narrowed in the vertical direction. The blending may be performed such that the boundary between the two images is translucent by appropriately controlling the a-value. Note that the manner of presenting the image in the transitional time period is not limited to the above and, for example, the images before and after the switching themselves may be slid upward or downward, or both of them may be enlarged or contracted in the vertical direction. In any case, the user can feel as if the user was currently moving to a different floor of the building by causing the image of the floor after the switching to appear from the direction that corresponds to the floor of the building.

The image shot on the floor after the switching is displayed as depicted in FIG. 12C after elapse of the transitional time period depicted in FIG. 12B. Note that, in a case where a plurality of images are associated with the floor after the switching or with the same position of this floor, if the shooting situation is made selectable as in the first embodiment, for example, accessing an image of a desired situation of a desired floor is facilitated. Moreover, in a case where an elevator is included in an image currently displayed, if the same elevator is also included in an image of the floor after the switching, the user can easily determine the direction of moving the viewpoint thereafter with a feeling as if the user had actually moved on the elevator.

Therefore, in a case where an elevator is included in the image currently displayed, the icon 172 for floor number selection may be displayed when an image of the elevator is pressed down for a long time instead of the icon 94 for movement depicted in the image 170. In this case, the input information acquiring part 50 recognizes that the area of the image of the elevator is pressed down for a long time, and the image switching part 66 determines the field of view such that the image of the elevator is also included in the image after the switching. In a case where, not limiting to an elevator, the same equipment is present at the same position on a plurality of floors such as an escalator, a stairway, or a rest room, perception of the position is further facilitated by presenting the image of the corresponding equipment also after the switching.

In this case, a plurality of pieces of equipment for each of which an operation for displaying the icon 172 for floor number selection is received are set in advance and, when any of these pieces of equipment is included in the image currently displayed, the input information acquiring part 50 detects a designating operation for the area of the image thereof. The operation performed in this case may be a long pressing-down operation or may be any other predetermined operation. When the display is switched to the image of the floor selected on the icon 172 for floor number selection, the image switching part 66 determines the field of view such that the image of the same equipment is included therein. Note that, although the depicted example is the shot image of the inside of the building, the display target in this embodiment is not limited to the above. The display target may be an image of the outside of the building or an image of a land having a difference in elevation, for example, as long as the image can be associated with the data of the height that is difficult to be indicated on a two-dimensional map.

Figure 13:
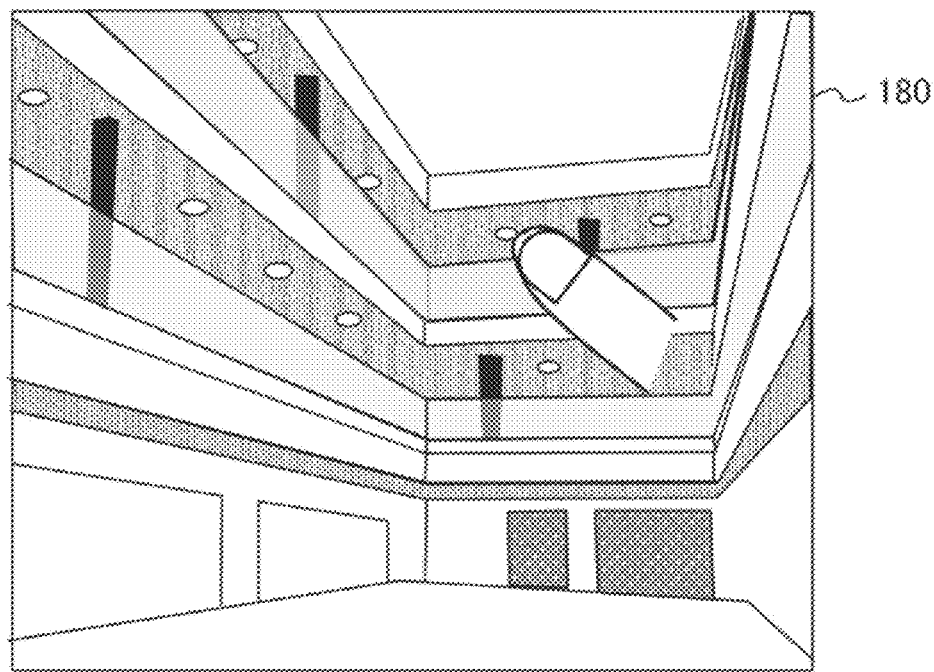
FIG. 13 is a diagram depicting another mode to receive an operation for selecting a floor number in this embodiment.

FIG. 13 depicts another mode to receive an operation for selecting the floor number. In this example, a display image 180 represents the inside of a building with an open-ceiling structure. In other words, floors other than the floor currently displayed (the floor for which a viewpoint moving operation in the horizontal direction is received) are included in the field of view. In this case, it is more efficient and easier to understand to set such that another floor as a movement destination can be directly selected. In this case, too, it is assumed that a movement to another floor is caused by a long pressing-down operation in order to avoid confusion with a viewpoint moving operation in the horizontal direction on the floor currently displayed. The depicted example indicates that a third-floor portion is being pressed down for a long time by a finger, and the input information acquiring part 50 senses this operation and the image switching part 66 thereby switches the display to the third-floor portion.

Because the movement destination is directly pressed down for a long time, the image after the switching in this case is preferably an image of the vicinity of the position, on the selected floor, at which the long pressing-down operation is performed. This enables the line of sight to be freely moved in the building including the up-and-down direction. Not being limited to the open ceiling structure, this mode can be similarly realized if part of another floor is included in the image of the floor currently displayed such as the vicinity of an escalator or a stairway. The transition of the image may be similar to that depicted in FIGS. 12A to 12C, or the viewpoint may be gradually moved to a designated position. Note that the moving operation to another floor is not limited to the long pressing-down operation as long as the operation can be distinguished from a moving operation in the horizontal direction on the same floor. For example, this operation may be a multi-touch operation, a double-tap operation, or the like. Moreover, this mode may be combined with the mode where the icon for floor number selection is displayed, or may independently be realized.

Figure 14:
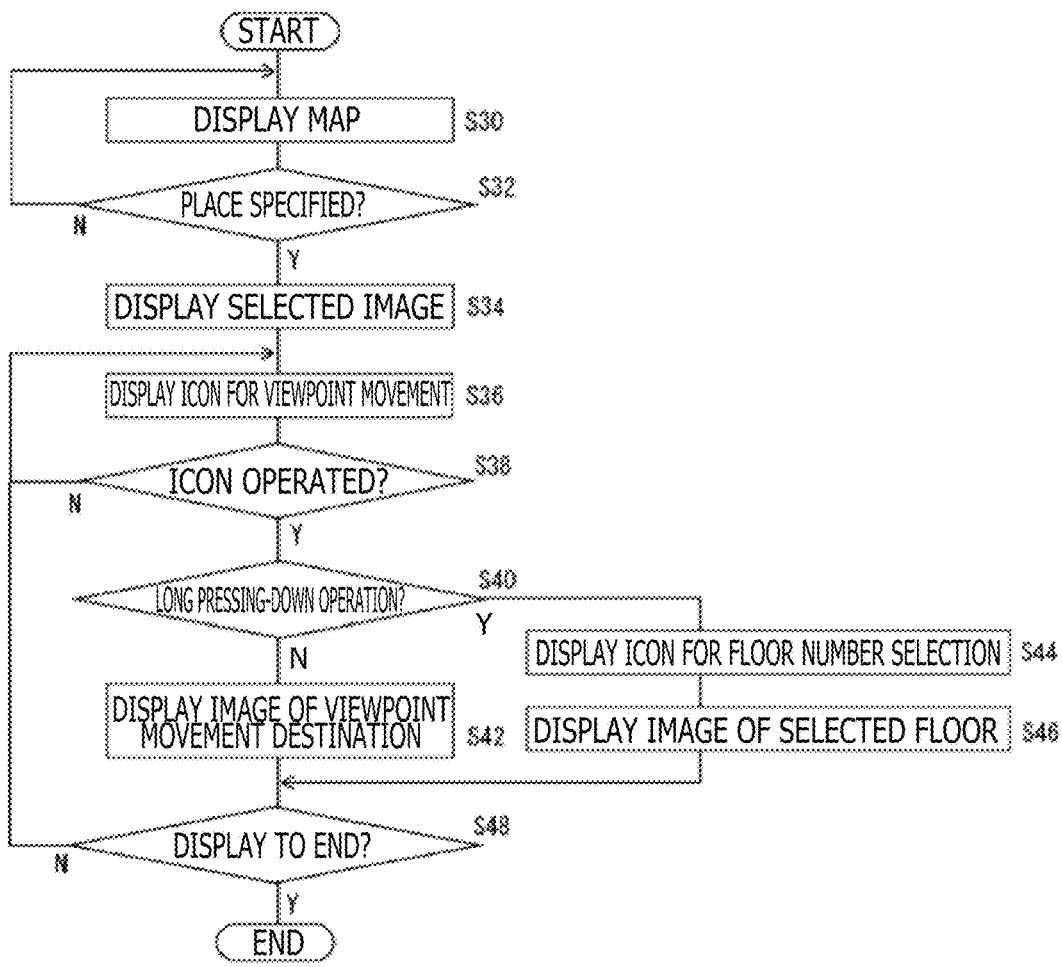
FIG. 14 is a flowchart depicting a process procedure for the image processing device to display a shot image corresponding to a place in cooperation with the image providing server in the second embodiment.

A process procedure for image display of this embodiment that can be realized by the above configuration will be described next. FIG. 14 is a flowchart depicting the process procedure for the image processing device 10 to display a shot image corresponding to a place in cooperation with the image providing server 20. Although this flowchart assumes a mode where a shot image is displayed as part of a map application, as described above, the process executed in the pre-stage of the image display is not limited to the map display. Moreover, although an image displayed by the image displaying part 56 is basically an image for which the data requesting part 52 requests and the data acquiring part 54 acquires data of the image transmitted from the image providing server 20, the procedure therefor is omitted from the description.

When the map application is first started up by a user operation performed on the image processing device 10, the image switching part 66 of the image displaying part 56 displays an image of an electronic map on the displaying device 16 (S30). Until a place is specified by the user inputting the name of a facility that the user desires to search for or designating a position on the map, for example, the image switching part 66 waits while executing a process not depicted in accordance with an operation for the map (N of S32). When a place is specified (Y of S32), as depicted in FIG. 5B, the image switching part 66 displays in an enlarged manner an image selected in accordance with a predetermined rule from among images of a building that is present at this place (S34).

At this time, similar to the first embodiment, thumbnails may be once displayed and the user may be allowed to select the image to be displayed in an enlarged manner, or the image providing server 20 may select the image from the database in accordance with a predetermined rule. The icon displaying part 64 thereafter displays the icon for viewpoint movement to move the viewpoint in a superimposed manner on the shot image (S36). If no operation is performed on the displayed icon for viewpoint movement, the image displaying part 56 waits while executing a process not depicted in accordance with an operation for turning the line of sight or selecting another image, for example (N of S38). When an operation is performed on the icon for viewpoint movement (Y of S38) and this operation is not a long pressing-down operation (N of S40), the viewpoint change processing part 68 switches the display to an image of the movement destination of the viewpoint (S42).

When the operation on the icon for viewpoint movement is a long pressing-down operation (Y of S40), the icon displaying part 64 displays the icon 172 for floor number selection as in the image 170 in FIG. 12A (S44). If a certain floor of the icon 172 for floor number selection is selected, the image switching part 66 displays an image of the selected floor (S46). At this time, as depicted in FIG. 12B, after elapse of a transitional time period in which a presentation is performed as if the image after the switching appears from the direction that corresponds to the vertical-structural relation of the floors, an image of the floor after the switching as depicted in FIG. 12C is displayed. Moreover, in the case where the image data is managed according to the positions, an image of the same position as the position before the switching is displayed.

Note that, in the case where a touch pad supporting multi-touch operations is introduced, instead of the processes at S38, S40, and S44, a multi-touch swiping operation is performed and an image of the next floor in the direction opposite to the direction of the sliding is displayed. Moreover, in the case where a long pressing-down operation on an image of a predetermined piece of equipment is received, a designating operation for the image of this equipment is determined instead of the determination for the long pressing-down operation on the icon for viewpoint movement at S38 and S40. At S46, the image of the same piece of equipment is caused to be included in the display.

Furthermore, in the case where part of another floor appears in the image displayed at S34, a designating operation for the image of the other floor is determined instead of the determination for the long pressing-down operation on the icon for viewpoint movement at S38 and S40. In this case, the display process of the icon for floor number selection at S44 is omitted and, at S46, an image of the corresponding position from among images of the designated other floor is displayed.

When the display does not need to be caused to come to an end by a user operation or the like, the processes at S36 to S46 are repeated (N of S48). At this time, the image after the switching in the viewpoint moving operation at S42 and the candidate images displayed as the thumbnails are limited to the images of the floor immediately previously selected, and images of the other floors are thereby prevented from being displayed irrelevantly. When it is required to end the display, all the processes are caused to come to an end (Y of S48).

According to this embodiment described above, during the display of a shot image of a place specified by the user, the icon for floor number selection for selecting the floor number of a building is displayed by a specific operation. The display is thereafter switched to an image of the floor selected by an operation performed on the icon. Therefore, even images corresponding to the same position on a two-dimensional map can be displayed in distinction from each other on the basis of the floors, and the user can check the appearance or grasp the structure while focusing on the floor with which the user has things to do or in which the user is interested.

In the mode where an image of a place is appreciated from an arbitrary viewpoint in an arbitrary line of sight using a whole-sky image, transition can be made among the floors with an operation feeling similar to the case of moving the viewpoint, turning the line of sight, or the like. Furthermore, a sense of presence like exploring a building can be provided by setting a transitional time period in which a presentation is performed as if an image of a selected floor appears from a direction that corresponds to the vertical-structural relation of the floors. Moreover, in response to the selection of the floor, images to be displayed thereafter are limited to images of the same position on this floor, and a situation where an image of an unrelated floor suddenly appears is thereby avoided, and the sense of presence is less likely to be degraded. Furthermore, the icon for floor number selection is displayed in a superimposed manner on the image currently displayed, and easy transition among the floors is thereby enabled, compared to the case of displaying a selection menu separately.

Furthermore, in the case where common equipment is present at the same position of a plurality of floors, a designating operation for an image of the equipment is received and this image is caused to be included in the field of view both before and after the switching of the displayed floor. This enables the user to grasp the directions easily even on the floor after the switching. Moreover, direct specification of another floor included in the image currently displayed or a position thereof is enabled, and the user can thereby easily move to the place to which the user desires to move even on another floor.

The present disclosure has been described as above on the basis of the embodiments. The above embodiments are exemplification, and those skilled in the art should understand that various modifications can be made to combinations of the constituent elements and the processing processes in the embodiments and, moreover, that these modifications are also within the scope of the present disclosure.

What is claimed is:

1. An image processing device comprising:
   input information acquiring circuitry that receives a user operation relating to an image displayed on a displaying device; and
   image displaying circuitry that, when the input information acquiring circuitry receives an operation for specifying a place by a user, causes the displaying device to display thereon an image of the place,
   wherein the image displaying circuitry further causes an icon for floor number selection for selecting a floor number of a building currently displayed to be displayed and, when the input information acquiring circuitry receives an operation, which is performed on the icon for floor number selection, for selecting another floor, changes display such that an image of the selected floor appears from a direction same as a direction corresponding to the selected floor in a vertical positional relation between the selected floor and a floor currently displayed, and
   wherein the image displaying circuitry changes the display to, from among images of the selected floor, an image of a calculated closest position horizontally on the selected floor in a same horizontal position of an image of the floor currently displayed,
   the image displaying circuitry displays an icon for movement for receiving an operation to move a viewpoint in a superimposed manner on a whole-sky image of the floor currently displayed, and
   when a long press on the icon for movement continues for a predetermined time period or longer from the user, the image displaying circuitry displays the icon for floor number selection in a superimposed manner on the whole-sky image while the long press is maintained.

2. The image processing device according to claim 1, wherein
   the image displaying circuitry provides a transitional time period in which an image of the floor currently displayed and the image of the selected floor are alpha blended.

3. The image processing device according to claim 1, wherein
   the input information acquiring circuitry acquires, as the user operation, the number of contact points on a touch pad that covers a screen of the displaying device and a moving direction of the contact points, and
   when a plurality of the contact points move in a direction regarded as an upward direction or a downward direction on the screen, the image displaying circuitry causes the displaying device to display thereon an image of a next floor in a direction opposite to the moving direction.

4. The image processing device according to claim 1, wherein
   the image displaying circuitry causes the icon for floor number selection to be displayed in response to an operation for designating an image of an object detected in an image currently displayed, and changes the display to an image of a field of view that includes the same detected object from among images of the selected floor.

5. The image processing device according to claim 4, wherein the object is an elevator.

6. The image processing device according to claim 1, wherein
   in response to an operation for designating an image of another floor appearing in an image currently displayed, the image displaying circuitry changes the display to an image of the other floor.

7. The image processing device according to claim 1, wherein
   when the input information acquiring circuitry receives an operation for moving a viewpoint during display of a whole-sky image of a selected floor, the image displaying circuitry switches the display to a whole-sky image of the same floor that is shot from a viewpoint as a movement destination.

8. An image display method by an image processing device, comprising:
   receiving a user operation relating to an image displayed on a displaying device;
   receiving an operation for specifying a place by a user that triggers causing the displaying device to display thereon an image of the place;
   causing an icon for floor number selection for selecting a floor number of a building currently displayed to be displayed;
   receiving an operation, which is performed on the icon for floor number selection, for selecting another floor that triggers changing a displayed content to an image of the selected floor from a direction same as a direction corresponding to the selected floor in a vertical positional relation and a horizontal position between the selected floor and a floor currently displayed,
   wherein the operation changes the display to, from among images of the selected floor, an image of a position on the selected floor in a calculated closest position horizontally of an image of the floor currently displayed;
   displaying an icon for movement for receiving an operation to move a viewpoint in a superimposed manner on a whole-sky image of the floor currently displayed, and continuing a long press on the icon for movement for a predetermined time period or longer from the user that triggers displaying the icon for floor number selection in a superimposed manner on the whole-sky image while the long press is maintained.

* * * * *